Aug. 26, 1958

A. S. LAMONT ET AL 2,849,047

PRESSURE CONTROL SYSTEM

Filed June 15, 1954

Inventors
Adam S. Lamont &
Edwin T. Todd

By

Attorney

Aug. 26, 1958

A. S. LAMONT ET AL 2,849,047

PRESSURE CONTROL SYSTEM

Filed June 15, 1954

INVENTORS
Adam S. Lamont &
BY Edwin T. Todd
L. D. Burch
ATTORNEY

United States Patent Office 2,849,047
Patented Aug. 26, 1958

2,849,047

PRESSURE CONTROL SYSTEM

Adam S. Lamont and Edwin T. Todd, Pontiac, Mich., assignors to General Motors Corporation, Detroit, Mich., a corporation of Delaware Application June 15, 1954, Serial No. 436,964

2 Claims. (Cl. 152—417)

This invention relates generally to air pressure control systems and more particularly to air pressure control systems for use in regulating the inflation of vehicle tires or other pressurized members while in use or otherwise.

Military vehicles, farm machinery and other heavy equipment are found to be more maneuverable under certain circumstances by varying the air pressure within the tires of such vehicles. Low tire pressures provide more traction for greater ease in moving heavy equipment over ice, swamp and marsh lands or the like. However, full tire pressure is desirable where speed and less driving effort is desirable. Air supply systems for regulating tire pressures while vehicles are in motion have been known in the past. However, such systems have not been entirely satisfactory. Due to the rough treatment given to equipment which is required to be moved over irregular terrain the air supply lines used in tire pressure control systems are subject to frequent ruptures and failures. Unless precautions are taken such failures will cause deflation of the vehicle tires. Numerous means to obviate this hazard have been previously proposed. Inasmuch as normal check valves may not be employed where both inflation and deflation are required through the same flow line such systems have generally required auxiliary air supply lines which only multiply the opportunity for failures within the system, make detection of the ruptured line more difficult, require a more complicated installation, consume additional space, and add considerable weight to the vehicle employing the system.

It is now proposed to provide an air pressure regulating system adaptable for use with vehicle tires to enable inflation and deflation of such tires while in use. It is proposed to provide a system having a common air pressure manifold for inflating or deflating all vehicle tires. The regulation of air pressure within the tires is centrally controllable from the driver's compartment of the vehicle having the proposed installation. Means are provided at each vehicle wheel for preventing deflation of the tires upon the failure of air lines connected thereto. Such means are however adapted to allow deflation of the tires in an air supply system which is free of ruptures.

The proposed air supply system includes a simple installation requiring a minimum number of air supply lines thereby enabling a reduction in weight and space consumption or the use of more durable air lines with no greater weight than on former installation. The use of a common inflation and deflation air manifold and the parallel disposition of air lines further enables more ready ease in detecting failures. Such line failures however are not detrimental to continued operation of the vehicle nor in need of immediate repair in view of the precautionary means provided against unexpected tire deflation.

Figure 1:
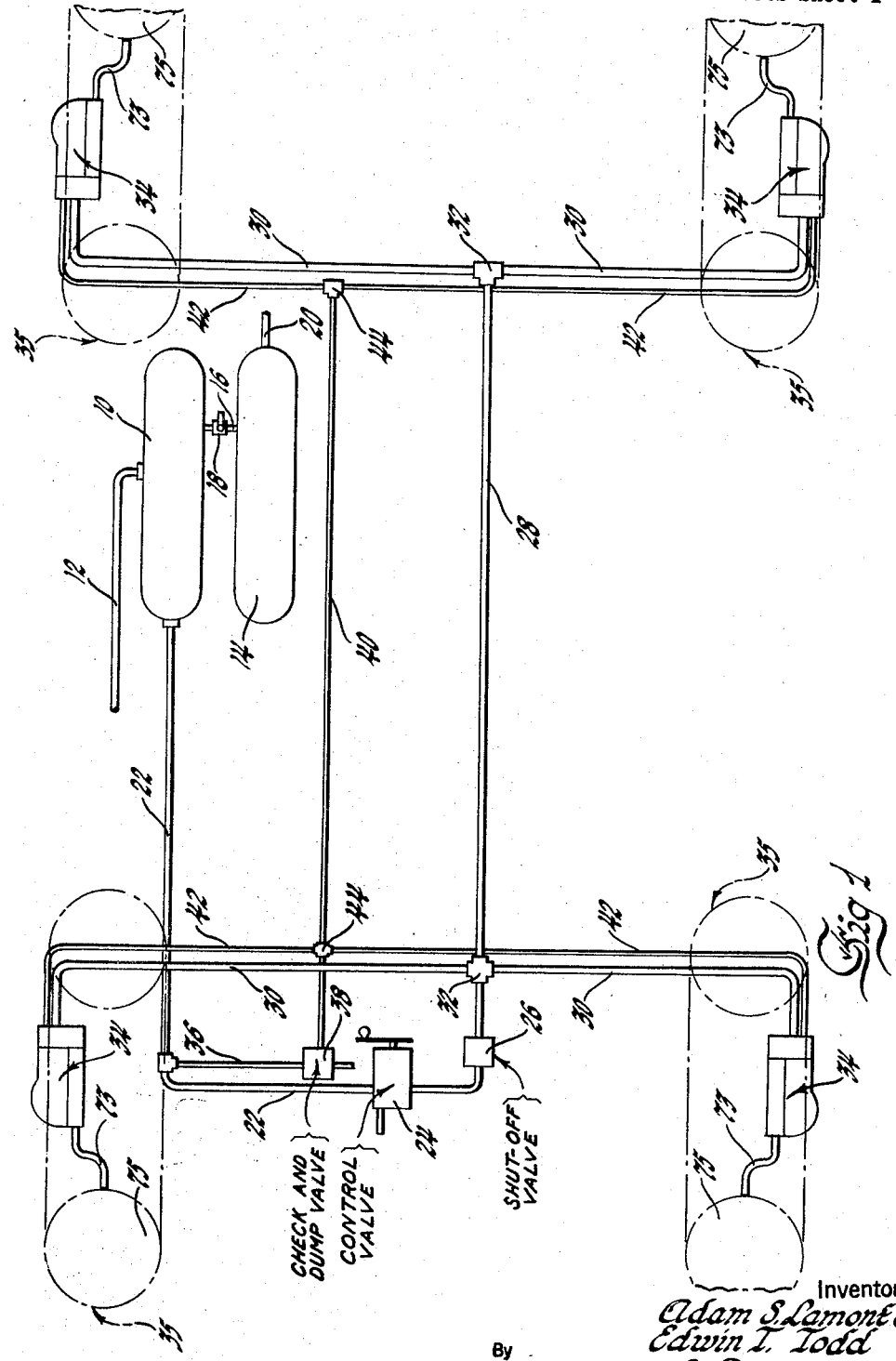
Figure 1 is a schematic layout of the proposed air pressure control system.
Figure 2:
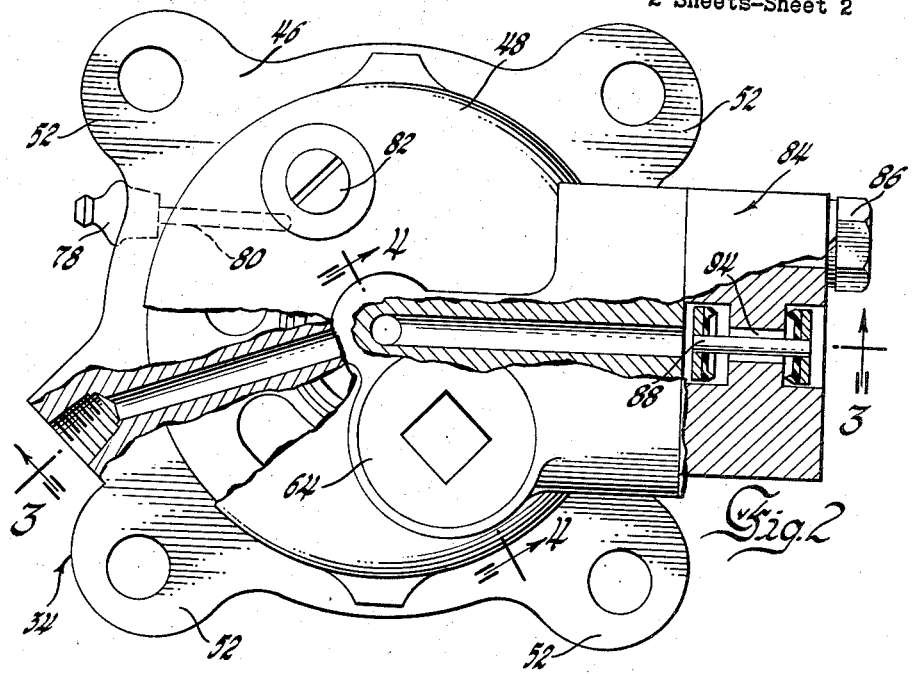
Figure 2 is a front view of the tire inflation assembly adapted to be secured to each vehicle wheel.
Figure 3:
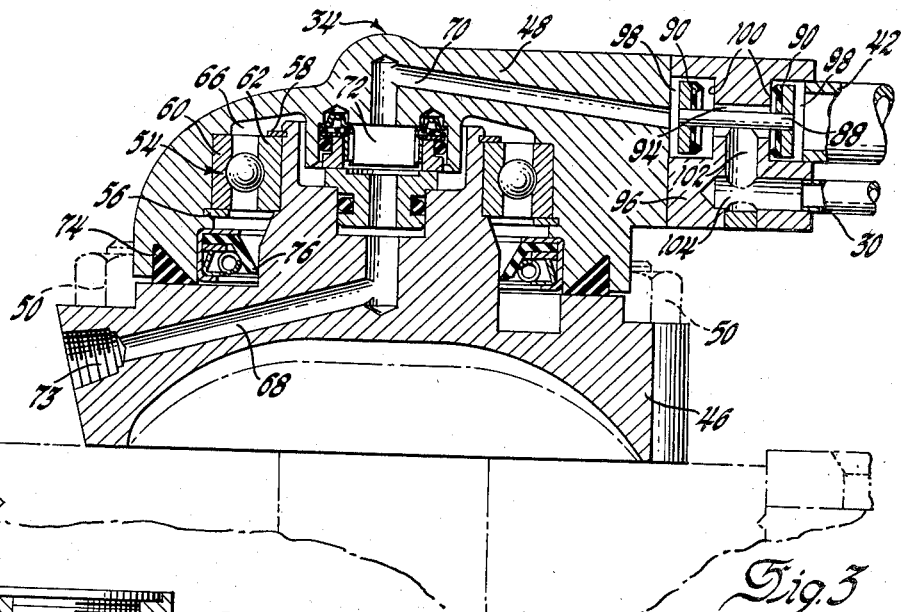
Figure 3 is a cross sectional view of the tire inflation assembly of Figure 2 taken substantially in the plane of line 3—3 thereon and viewed in the direction of the arrows.
Figure 4:
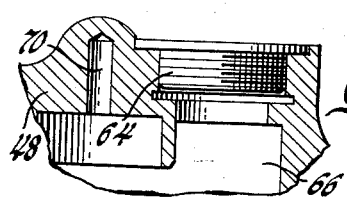
Figure 4 is a cross sectional view of a part of the tire inflation assembly of Figure 2 taken in the plane of line 4—4 and viewed in the direction of the arrows thereon.

The proposed air supply system as associated with a vehicle for control of tire pressures includes an air supply tank 10 having air supplied thereto through a line 12 connected to a motor driven air compressor or other source. An air supply reserve tank 14 for brake pressure is disposed adjacent the supply tank 10 and is connected thereto by a line 16 having a check valve 18 therein. Air is supplied to the brake system from the reserve tank 14 through a separate line 20. A full pressure supply line 22 is connected from the supply tank through a pressure regulating control valve 24 and a shut-off valve 26 to the inflation-deflation manifold 28. Branch lines 30 associated with the manifold line 28 through fittings 32 are connected to tire inflation hubs 34 secured to each vehicle wheel 35.

A full pressure feed line 36 is connected to the supply line 22 forward of the regulating control valve 24 and is adapted to provide full line pressure through a check and dump valve 38 to a central feed line 40. Branch lines 42 are connected by fittings 44 to the central feed line 40 and each branch line is associated with a tire inflation hub 34.

Each tire inflation hub 34 includes a rotating member 46 and a non-rotating member 48. The rotating member 46 is adapted to be secured to the vehicle wheel 35 by bolt means 50 extended through ears 52 formed on the rotating member. The non-rotating member 48 is adapted to be secured to the vehicle body, frame or the like and is associated with the rotating member 46 through a ball bearing member 54. Snap rings 56 and 58 are provided on opposite sides of the ball bearing member 54; one associated with the rotating member 46 and the other with the non-rotating member 48. The snap rings 56 and 58 hold the ball bearing races 60 and 62 in place and are thereby adapted to secure the two parts of the tire inflation hub 34 together. A threaded plug 64 is provided in the face of the non-rotating member 48 through which access may be had to the grease chamber 66 within which the ball bearing member 54 is disposed to enable removal of the snap ring 58 for disengaging the two parts of the tire inflation hub. Air supply passages 68 and 70 are formed through the rotating and non-rotating members 46 and 48 respectively. The air supply passages 68 and 70 are in communication with each other through a face seal member 72 centrally disposed between and within the hub members. The flexible air line 73 from the vehicle tire 75 is adapted to be connected into the threaded end of the passage 68.

There are two seals 74 and 76 provided between the rotating and non-rotating members 46 and 48 beside the face type seal 72. The innermost seal is the face seal 72 which is adapted to prevent air leakage into the grease chamber 66 within which the ball bearing member 54 is disposed. The outermost seal 74 is provided to protect the intermediate seal 76 from extraneous foreign matter. The intermediate seal 76 is a partial grease retainer and provides protection for the ball bearing 54 and the inner seal 72. A grease fitting 78 and passage 80 are provided through the rotating member 46 to the grease reservoir 66. A threaded closure 82 provides access to the grease chamber 66 near the grease fitting 78. Purging or flush lubrication of the outer seal 76 and the seal face 72 may be accomplished through the grease fitting 78 and incident passages. Centrifugal force during the rotation of the rotating member 46 will feed grease from the reservoir 66 to the outer seal 72 to lubricate the seal and counteract the tendency of foreign matter to enter past the seal.

A shuttle valve assembly 84 is secured to the non-rotating member 48 of each inflation hub 34 as by bolt means 86. The branch lines 30 and 42 from the inflation-deflation manifold 28 and the full pressure line 40 respectively are connected to the hub 34 through the valve assembly 84. A free floating double ended shuttle valve 88 is disposed within the valve body and is provided with inwardly facing seals 90 on opposite ends thereof. The shuttle valve 88 is disposed within a passage 94 formed through the valve body 96 of the shuttle valve assembly 84. The passage 94 is enlarged at each end as at 98 to accommodate the ends of the shuttle valve 88 and to provide surfaces 100 against which the inwardly facing seals 90 of the shuttle valve may seat. The passage 98 is in direct communication at one end with the passage 70 of the non-rotating member and at the other end with the full pressure branch line 42 connected to the valve body 96. Passages 102 and 104 are formed through the valve body 96 to intersect the passage 94 between the ends of the shuttle valve 88. Passages 104 and 102 provide communication between the manifold branch line 30, connected in one end of the valve body 96, and the passage 94.

In operating the proposed air system for the regulation of tire pressures, the valve 26 is open to allow the flow of air from the air supply tank 10 to the manifold 28. The pressure control valve 24 is regulated to provide the desired tire pressure within the manifold 28. At the same time the dump valve 38 being closed full line pressure is applied through the central feed line 40 and branch lines 42 to each tire inflation hub 34. The branch lines 42 being connected to the ends of the shuttle valve assembly 84 move the shuttle valve 88 to close the outer end of the passage 94 by engagement of the seal 90 with the seat 100 and open the other end to provide direct communication from the manifold branch lines 30 through passages 102 and 104 of the valve assembly, passages 70 and 68 of the non-rotating and rotating members, and the flexible connection 73 to the vehicle tire 75. The tire pressure may thus be maintained at the pressure within the inflation-deflation manifold 28. The full pressure line 40 and its branches 42 will hold the inner end of the valve 88 open to provide communication with the manifold 28 as long as the pressure within the feed lines 42 exceeds that within the vehicle tire and the manifold 28. The pressure within the manifold 28 may be raised or lowered by regulation of control valve 24 to vary the pressure within the vehicle tires 75.

In the event of rupture of the feed lines 40 or 42 the holding pressure on the end of the shuttle valve 88 will fall below that of the manifold 28 and the pressure within the vehicle tire 75 will act to shift the shuttle valve 88 to close-off the inner end of the passage 94 and prevent leakage of air from the tire. If the manifold 28 or any of its branch lines 30 are damaged, without injury to the feed lines 42, the dump valve 38 is opened to relieve the feed line pressure and cause the tire pressure to move the shuttle valve 88 to close off the inner end of passage 94 preventing the escape of air from the vehicle tire 75.

We claim:

1. A pressure control system adaptable for use in inflating and deflating vehicle tires while in use and which includes a source of pressurized air having an air manifold connected thereto, branch air lines connected to said air manifold and extended to each vehicle tire, means for controlling the air pressure within said manifold and branch air lines, full pressure air lines connected to said source of pressurized air and extended to each vehicle tire, and a valve assembly connected between and to the ends of said branch and full pressure air lines and to each of said vehicle tires, said valve assemblies each having a passage in direct communication with said tire and a free floating double ended shuttle valve disposed within said passage, said full pressure air lines being connected in said passages for moving said shuttle valves to close one end of said passage and to open the other end thereof, and said branch lines being connected into said passages intermediate the ends thereof for access through the open ends of said passages with said tires, said shuttle valve closing said one end of said passage as long as the air pressure in said full pressure air lines exceeds the air pressure in said vehicle tires.

2. In combination with a tire inflation hub having passages therethrough enabling inflation and deflation of vehicle tires while in use, a pressure control system for the regulation of said tire pressures which includes a source of pressurized air, an air manifold connected to said air source and having branch air lines connected to each tire inflation hub, means for regulating the air pressure within said manifold and said branch lines, full pressure air lines connected between said air source and each of said tire inflation hubs, and a shuttle valve assembly connected between the ends of said branch and air lines and said tire inflation hub, said valve assembly including a passage communicating with said hub passages and having a free floating double ended shuttle valve disposed therein, said full pressure air line connected to one end of said passage, said branch air lines communicating with said passage intermediate its ends, the air pressure through said full pressure lines moving said valve to close said one end of said passage and open the other end thereof, said passage remaining open at said other end for direct communication from said tire through said hub and valve assembly with said branch lines and air manifold as long as said full line air pressure exceeds the air pressure within said tire.

References Cited in the file of this patent

UNITED STATES PATENTS

| 43,167 | Vaessen | June 14, 1864 |
| 939,987 | Dawley | Nov. 16, 1909 |
| 2,206,356 | Hutchings | July 2, 1940 |
| 2,395,941 | Rockwell | Mar. 5, 1946 |
| 2,685,906 | Williams | Aug. 10, 1954 |

FOREIGN PATENTS

| 418,660 | Great Britain | Oct. 30, 1934 |